R. S. BRYANT.
RIM FOR VEHICLE WHEELS.
APPLICATION FILED MAY 27, 1912.

1,237,614.

Patented Aug. 21, 1917.
2 SHEETS—SHEET 1.

Witnesses:
Chas. C. Watt
Brennan B. West

Inventor
Richard S. Bryant
By Hull & Smith Attys.

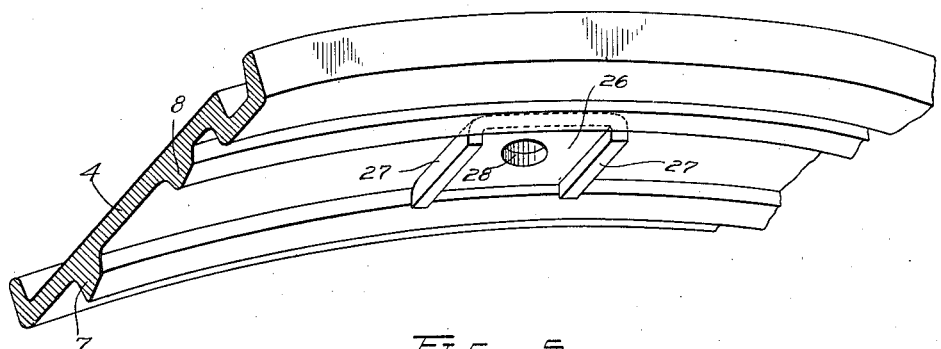
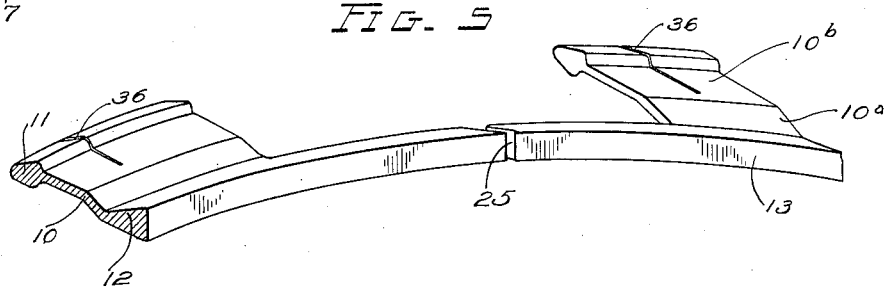
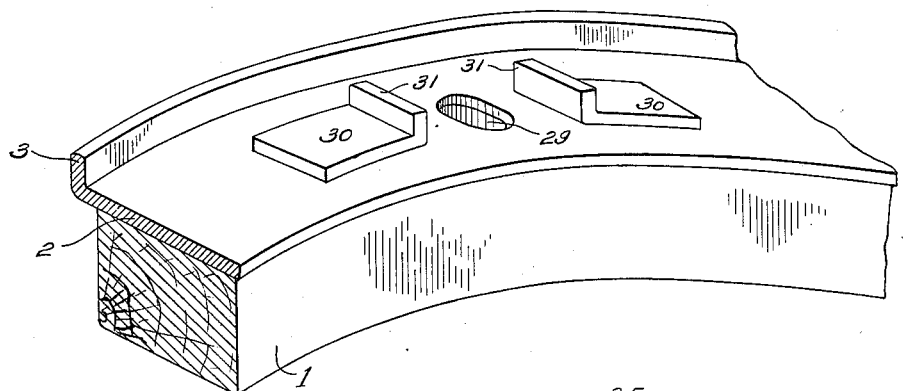
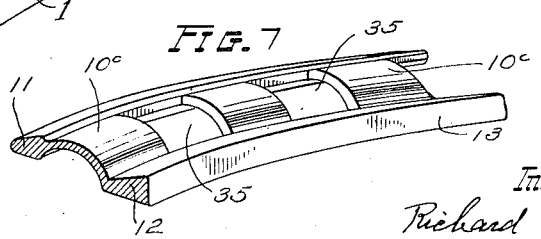

UNITED STATES PATENT OFFICE.

RICHARD S. BRYANT, OF CLEVELAND, OHIO, ASSIGNOR TO THE STANDARD WELDING COMPANY, OF CLEVELAND, OHIO, A CORPORATION OF OHIO.

RIM FOR VEHICLE-WHEELS.

1,237,614.        Specification of Letters Patent.      Patented Aug. 21, 1917.

Application filed May 27, 1912. Serial No. 699,929.

*To all whom it may concern:*

Be it known that I, RICHARD S. BRYANT, a citizen of the United States, residing at Cleveland, in the county of Cuyahoga and State of Ohio, have invented a certain new and useful Improvement in Rims for Vehicle-Wheels, of which the following is a full, clear, and exact description, reference being had to the accompanying drawings.

This invention relates to vehicle wheels and particularly to that type of wheel wherein is provided a detachably secured tire-receiving rim. The general object of such a construction, as is well known, is to permit an extra rim provided with a tire in readiness for use to be carried upon an automobile so that in case of tire troubles this new rim can be expeditiously and conveniently substituted for one originally upon the wheel. Prior devices of this character have frequently been of cumbersome, ponderous, and unsightly construction, complicated and expensive to manufacture, unreliable in operation, and poorly adapted to the exposure, vibration, wear, and corrosion to which such devices are subjected. The object of this invention is to provide a demountable rim of the greatest simplicity and reliability and which shall comprise the smallest possible number of separate parts; the provision of a demountable rim wherein there shall be no necessity for the disconnection of any parts, whereby the possibility of losing or misplacing the parts will be avoided; the provision of a demountable rim in which the very operation of attaching it to the wheel will cause it to be efficiently "trued up" or brought into the same plane as the felly even by an inexperienced person; the provision of a device which can be cheaply made and easily assembled; the provision of a device of great strength combined with lightness and elegance; while further objects and advantages of my invention will become apparent in the course of the following description and claims.

Figure 1:
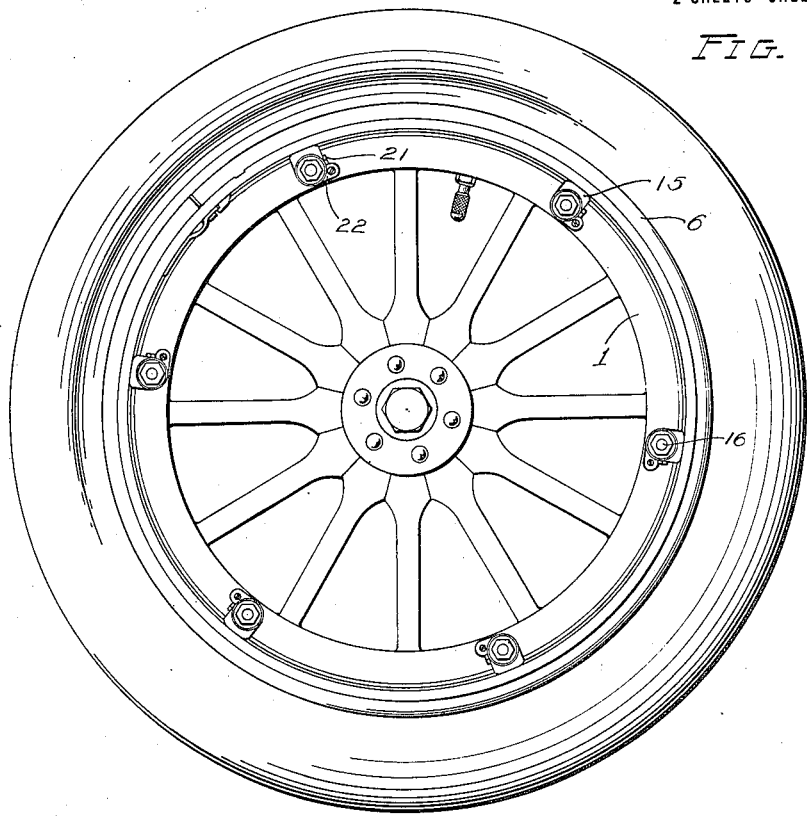
Figure 2:
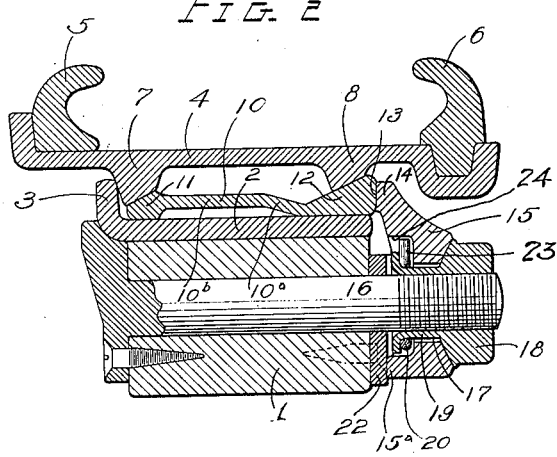
Figure 3:
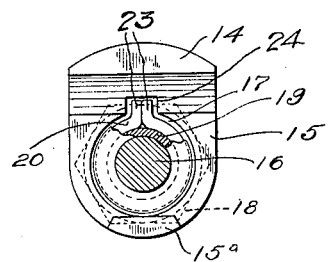

Generally speaking, my invention may be defined as consisting of the combinations of elements recited in the claims hereto annexed and illustrated in the drawings accompanying and forming a part hereof, wherein: Figure 1 is a side elevation of a complete vehicle wheel provided with a rim of my invention; Fig. 2 is a transverse cross-sectional view taken through the rim and felly and showing one of the retaining clips; Fig. 3 is an inner face view of one of the retaining clips, a portion of the nut flange being broken away; Fig. 4 is a perspective view of a portion of the demountable rim showing the driving block; Fig. 5 is a perspective view of a portion of the wedge ring showing the method of accommodating the valve stem and driving block; Fig. 6 is a perspective view of a portion of the felly and felly band illustrating the driving lugs, and Fig. 7 is a partial perspective view of a modified wedge ring.

Describing the parts by reference characters, 1 represents the felly of a vehicle wheel and 2 the felly band which embraces the same and holds the same together. As is well known, whenever a wooden wheel is used a metallic band is necessarily shrunk thereon in order to bind the same firmly together. However, my invention is totally independent of the particular construction of the wheel, wherefore I desire it to be understood that I do not limit myself to a construction wherein a felly band is employed separate from the felly, since wheels will doubtless be made wherein the felly and felly band are integral, and I desire that my specification and claims be read with this in view, wherefore I shall designate the wheel portion generally by the term "circular member."

At one edge of this circular member, preferably the rearward edge, is an outstanding abutment, here shown as an outturned peripheral lip 3 integral with the felly band, while the opposite side of the circular member is preferably left plain. Surrounding this circular member is an annular, tire-receiving rim comprising essentially a base portion 4 and tire-engaging flanges 5 and 6. In this application, I have illustrated a rim of the so called universal, "quick-detachable" type, substantially like that shown in Fig. 8 of the drawings accompanying my copending application, filed April 25, 1912, Ser. No. 693,078, although the particular type of rim employed, the shape of its flanges, the method of securing them to the rim base, the direction in which they are turned, and the type of tire employed are absolutely independent of the present invention. Formed upon the inner surface of the base portion 4 of the rim are a pair of spaced, parallel, annular, inwardly-projecting, integral ribs 7 and 8, the height of the rib 7 preferably but not necessarily being greater than that of the rib 8, and both of the ribs having their inner surfaces inclined toward the forward side of the rim. The shallower rib 8 is disposed adjacent to the side of the rim which is to lie upon the outer or more accessible side of the wheel, in this case upon the same side of the rim as the detachable flange 6, while the rib 7 is so disposed as regards the edge of the rim as to engage the face of the lip 3 at the time when the rim has been fully seated upon the circular member.

Between the rim and circular member is introduced a wedge ring 10 said wedge ring having at its inner edge a wedge portion 11 adapted to be interposed between the surface of the circular member and the rib 7 and having at its outer edge a second wedge portion 12 adapted to be interposed between the surface of the circular member and the rib 8, the distance between these wedge portions being such as to cause them to press uniformly upon both ribs when shifted into place. The portion of the ring between the wedge portions is formed as a web, and may if desired be formed so as to yield transversely in order to equalize the thrust upon the two wedge portions. In the embodiment illustrated in Fig. 2 it will be noted that a portion of the web adjacent to the wedge 12 is first bent outwardly away from the felly band as at 10$^a$ and afterward deflected substantially parallel with the band as at 10$^b$, the result being to render this web slightly yielding. The normal distance between the portions 11 and 12 of the ring is made slightly greater than the distance between the ribs 7 and 8 of the rim, so that the portion 11 will engage its rib slightly in advance of the portion 12, with a consequent yielding of the intermediate web. It will be understood that this yielding feature can be omitted without departing from my invention or changing the mode of operation of my device, in case the parts be made with sufficient accuracy to cause them to engage properly. The outer edge of the ring is preferably squared as at 13 for the reception of the toe 14 of a clip 15 secured to a bolt 16 mounted in the felly and by means of which the ring is thrust and held in place.

I have illustrated in these drawings (see Figs. 2 and 3 more particularly) a clip of the automatic or self-acting type invented by me and disclosed and broadly claimed in my copending application, filed May 6, 1912, Ser. No. 695,413, although various expedients may be employed instead of the one I have illustrated. This clip consists essentially of a metallic block having at one side a toe 14 and at the other side a heel 15$^a$, with an aperture 17 between the two. This aperture merges with a concave recess at its outer end of substantially the same curvature as the opposed face of a nut 18 formed with an axial sleeve 19 upon which the clip is rotatably mounted. The aperture 17 being of larger diameter, at least in one direction, than that of the exterior diameter of the sleeve, the clip is thus rendered capable of rocking movement relatively to the nut 18. Said nut 18 is interlocked with this clip by having said axial sleeve 19 flared to overlap the inner surface of the same, a friction device 20 being interposed between the nut and clip so as to tend to cause the latter to rotate with the former, while the amount of rotation of said clip may be limited in any convenient manner as by means of a tongue 21, carried by the thrust plate 22 against which the heel 16 is adapted to rest.

The specific friction device illustrated comprises a circular spring wire ring that is sprung around the sleeve 19 on the nut, said ring having out-turned ends 23 attached to be received in a recess 24 formed in the interior face of the clip 15. The normal interior diameter of the ring 20 is slightly less than the exterior diameter of said sleeve 19, thus providing a frictional engagement between the two parts, as will be obvious. It is obvious that any suitable type of clip can be employed in place of the one just described, without affecting the mode of operation of the remainder of the invention, since the sole object of such clip is to secure the ring 10 in place.

In order to permit the necessary contraction and expansion of the ring 10, the same is split at one or more points as shown at 25 in Fig. 5, and to accommodate the valve stem and driving block, a portion of the ring is removed for a distance from each of said ends as illustrated in the same figure. The driving block carried by the rim preferably takes the form of a U-shaped block having its base portion 26 secured to the rim between the ribs and having its arms 27 projecting radially inward, the base of this block being apertured as at 28 for the passage of the valve stem. Carried by the felly band 2 at each side of the valve aperture 29 is a block 30 riveted or welded thereto and having an upturned end 31 adapted to engage the arms 27 of the driving block. This construction is advocated in preference to the usual solid block because of the somewhat greater distance between the felly band and the base of the rim than in the usual construction, and the location of this block in close proximity with the valve stem is preferred owing to the fact that the ring 10 can be positioned with respect to the blocks 30 only by being buttoned over the same, and this should be done simultaneously with the introduction of the valve stem into the felly aperture.

The ring 10 is slightly elastic and is preferably made of a normal size slightly larger than the interior diameter of the rim with which it is used, so that when released it will tend to disengage the felly band and will also become interlocked securely with the rim so as to avoid any chance of becoming accidentally lost or disengaged. It is entirely a matter of personal choice whether a different ring shall accompany each rim or whether a single ring shall be employed with each felly band and transferred from rim to rim as desired.

In Fig. 7 I have illustrated a slightly modified form of wedge ring wherein portions of the web are cut away to form apertures 35 which serve to lighten the ring and also to increase the flexibility of the remaining portions of the web. In this view I have also shown the web as in the more pronounced curvature as at 10ᶜ so that its flexibility is yet further increased.

In Fig. 5 I have illustrated still a further expedient for increasing the flexibility of the wedge ring, this expedient consisting in severing the inner edge of the same by means of spaced transverse scarfs 36.

Both or either of these expedients may be employed for overcoming improper work on the parts of the wheelwright or automobile repairer. It is perfectly possible to form the circular member and rim so accurately that the wedge portions of the ring will seat simultaneously against the corresponding portions of the rim and circular member, but it sometimes happens that during the operation of securing the felly band to the wheel the same becomes warped, distorted or flared so that the ring will engage the different wedging portions unequally. In case the ring be made slightly yielding as above described, the rim will be found to operate satisfactorily notwithstanding more or less inaccurate and slovenly work in applying the same.

When it is desired to mount a rim of this type upon a wheel, the ring 10 being already interlocked with the interior of the rim, the rim and ring are positioned upon the wheel, after which the clips 15 are shifted into engaging position and are advanced so as to wedge the ring between the circular member on the one side and the ribs 8 and 9 on the other side. Movement of the rim across the circular member is absolutely limited by the engagement of the rib 7 with the flange 3, no matter how carelessly the rim be applied or how unevenly the nuts 18 may be set up. The ribs 7 and 8 are preferably formed by rolling and may either leave the upper surface of the rim flat as is shown or embossed in a well known manner. While I have necessarily described my invention in detail, I do not propose to be limited to such details, except as the same may be positively included in the claims hereto annexed or may be rendered necessary by the prior state of the art.

Having thus described my invention, what I claim is:

1. In a vehicle wheel, the combination with the wheel body; of a rim adapted to loosely surround said body; means on the latter adapted to limit the movement of said rim transversely of said body in one direction, said rim being provided on its inner face with transversely spaced, circumferentially extending bearing portions inclined in a direction away from said means; and a separate member movable transversely between said body and rim and having on its outer face transversely spaced, circumferentially extending bearing portions complementary to those on said rim, whereby said member is adapted both to positively engage said rim and move the same transversely against said means and to press radially outwardly against said rim to center the same upon said felly.

2. In a vehicle wheel, the combination with the wheel body; of a rim adapted to loosely surround said body; means on the latter adapted to limit the movement of said rim transversely of said body in one direction, said rim being provided on its inner face with transversely spaced, circumferentially extending ribs inclined in a direction away from said means; a transversely split ring movable transversely between said body and rim and having on its outer face transversely spaced, circumferentially extending ribs complementary to those in said rim, whereby said ring is adapted both to positively engage said rim and move the same transversely against said means and to press radially outwardly against said rim to center the same upon said body; and means carried by the latter adapted to move said ring.

3. In a vehicle wheel, the combination, with a circular member and a rim adapted to surround the same, of interengaging means carried by said rim and circular member for maintaining them in the same plane, a wedge ring separate from both rim and circular member for maintaining them concentric to each other, and interfitting radial projections carried by said circular member and rim for preventing relative circumferential displacement thereof, said wedge rings being cut away adjacent to said projections.

4. In a vehicle wheel, the combination, with a circular member having a laterally facing abrupt, radial abutment and a rim adapted to surround said circular member, the interior of said rim being formed with a pair of spaced parallel ribs, the side of one of said ribs being square and forming an abrupt shoulder adapted to engage said abutment, of wedge means adapted to be interposed between said circular member and rim and having inclined portions adapted to engage said ribs, and means for forcing said wedge means transversely of said rim and circular member toward said abutment.

5. In a vehicle wheel, the combination, with a circular member having a laterally facing abutment and a rim adapted to surround said circular member, the interior of said rim being formed with a pair of spaced parallel ribs, one of said ribs defining a shoulder adapted to engage said abutment, of a wedge ring adapted to surround said circular member inside of said rim and having a pair of spaced inclined portions adapted to engage said ribs, and means for forcing said wedge ring transversely of said rim and circular member.

6. In a vehicle wheel, the combination, with a circular member having at its rearward outer edge a radially outstanding abrupt abutment, of a demountable rim adapted to surround said circular member and having at its rearward side an inwardly projecting, radially faced portion adapted to engage said abutment, said rim having upon its interior surface spaced portions inclined away from said abutment, a ring adapted to be interposed between said rim and circular member and to engage the inclined portions of said rim, and means for forcing said ring toward said abutment.

7. In a vehicle wheel, the combination, with a circular member having at its rearward outer edge an outstanding abutment, of a demountable rim adapted to surround said circular member and having at its rearward side an inwardly projecting portion adapted to engage said abutment, said rim having upon its interior surface spaced portions inclined away from said abutment, of a wedge ring adapted to be interposed between said rim and circular member and having spaced inclined portions adapted to engage the inclined portions of said rim, and means carried by the circular member and engaging the forward edge of said ring for forcing the same toward said abutment.

8. In a vehicle wheel, the combination, with a circular member and a demountable rim adapted to surround the same, said rim having upon its inner surface a pair of spaced circumferential ribs, the inner faces whereof are inclined in the same direction, of an expansible wedge ring adapted to be inserted within said rim and having spaced inclined portions adapted to engage the inclined portions of said ribs, means carried by said circular member adapted to engage said ring for shifting the same transversely thereof, and interengaging means carried by said rim and circular member for limiting the movement of said rim transversely thereof.

9. In a vehicle wheel, the combination, with a circular member and a demountable rim adapted to surround the same, said rim having upon its inner surface a plurality of spaced inwardly projecting portions the inner faces whereof are inclined toward the forward edge of the rim, of a wedge ring adapted to be inserted within said rim and having spaced inclined portions adapted to engage the inclined portions of said rim, means carried by said circular member adapted to engage said ring for shifting said ring transversely thereof, interengaging means carried by said rim and circular member for limiting the movement of said rim transversely thereof, and interengaging means carried by said rim and circular member intermediate of said inclined portions for preventing relative circumferential movement thereof.

10. In a device of the character described, the combination, with a pair of concentric annular members, one of which has spaced laterally inclined portions of its surface presented toward the other member, of a U-shaped block having its base portion secured to one of said members intermediate of its inclined portions and having its arms extended toward the other member, abutments secured to the other member and engaging said arms, wedge means separate from both members interposed between said members and engaging said inclined portions, devices secured to one of said members and engaging said wedge means for shifting the same laterally thereof and forcing the same into engagement with said inclined portion, and means for limiting the relative transverse movement of said annular members.

11. In a vehicle wheel, the combination with a circular member having a substantially cylindrical exterior and an outstanding abutment adjacent at its rearward edge, of a demountable rim adapted to surround said circular member and having upon its inner surface a pair of spaced circumferential ribs whose inner surfaces are inclined in the same direction, one of said ribs having a laterally facing shoulder adapted to engage said abutment whereby the transverse movement of said rim relative to said circular member is limited, a split ring adapted to be interposed between said rim and circular member and having spaced inclined portions adapted to engage the inclined portions of said ribs, means carried by said circular member for forcing said ring toward said abutment, and interfitting driving lugs carried by said rim and circular member, the portion of said ring between its inclined portions being cut away adjacent to said driving lugs.

12. In a vehicle wheel, the combination with a felly and a felly band, said felly band having a substantially cylindrical exterior and an outstanding abutment adjacent to its rearward edge, of a demountable rim adapted to surround said felly band and having upon its inner surface a pair of spaced circumferential ribs whose inner surfaces are inclined in the same direction, the rearward of said ribs having an outwardly facing shoulder adapted to engage said abutment whereby the transverse movement of said rim relative to said felly band is limited, an elastic, expansible split ring interlocked with said ribs and having spaced inclined portions adapted to engage the inclined portions thereof, means carried by said felly for forcing said rim toward said abutment so as to constrict the same upon said felly band and interfitting driving lugs carried by said rim and felly band and disposed between said ribs, the portions of said ring between its inclined portions being cut away adjacent to its meeting ends for the reception of said lugs, one of said lugs being apertured for the reception of the valve stem.

13. The combination with a fixed member and a removable member; of a third member adapted to be interposed between the first two, said third member having transversely spaced, elastically connected, portions formed to engage with said first-named members to wedge the same apart.

14. The combination, with a fixed member and a removable member, one of said members having spaced wedge portions presented toward the other member, of a wedge member adapted to be interposed between the two and having separate wedging portions adapted to coöperate with said first wedge portions, said wedge member also having an elastic portion between said wedging portions.

15. The combination, with a pair of concentric annular members, one of said members having portions presented toward the other member laterally inclined, of a wedge member adapted to be interposed between the two and having laterally spaced wedging portions adapted to coöperate with said first wedge portions and an elastic portion between said wedging portions, and means carried by one of said annular members for forcing said wedge member to its seat.

16. In a vehicle wheel, the combination with the wheel body; of a rim adapted to surround said body; and a transversely split ring adapted to be interposed between said rim and body, said ring having transversely spaced portions formed to engage with said body and rim to wedge the same apart and an elastic intermediate portion connecting said first-named portions.

17. In a vehicle wheel, the combination, with a felly and a rim adapted to surround the same, the interior of said rim being formed with a pair of spaced parallel ribs, of wedge means having spaced inclined portions adapted to engage said ribs and an elastic portion between said inclined portions, the normal distance between the inclined portions of said wedge means being greater than the distance between said ribs, means for engaging the side of said wedge means for forcing the same transversely of said rim and felly, and means for fixing the transverse position of said rim upon said felly.

18. In a vehicle wheel, the combination, with a circular member having a laterally facing abutment and a rim adapted to surround said circular member, the interior of said rim being formed with a pair of spaced parallel ribs, one of said ribs defining a shoulder adapted to engage said abutment, of a wedge ring adapted to surround said circular member inside of said rim and having adjacent to each of its edges an inclined portion adapted to engage one of said ribs, the portion of said ring between said inclined portion being laterally yielding, and means for engaging one edge portion of said wedge ring for forcing the same toward said abutment.

19. In a vehicle wheel, the combination, with a circular member having a laterally facing abutment and a rim adapted to surround said circular member, the interior of said rim being formed with a pair of spaced parallel ribs, one of said ribs defining a shoulder adapted to engage said abutment, of a wedge ring adapted to surround said circular member inside of said rim and having adjacent to each of its edges an inclined portion adapted to engage one of said ribs, the side of said ring being intersected by scarfs or slots whereby the adjacent wedge portion is rendered discontinuous, and means for engaging one edge portion of said wedge ring for forcing the same toward said abutment.

20. The combination, with the felly of a wheel having a band, a rim thereon, and a wedge ring for holding said rim in place, of a clamp having a concave seat and engaging said wedge ring, a spring washer between the clamp plate and said band, a bolt passing through said felly and the plate and washer, and a nut loosely carried by said plate and non-detachably held therein.

21. A clamping device for the purposes stated, comprising a plate having an aperture provided with a concave seat, a nut having a convex face engaging said seat and having its inner end outwardly-turned, and a washer resiliently engaging said outturned portion to hold said nut frictionally and non-detachably on the plate.

22. In a clamp device, the combination with a pair of members, one threaded in the other so as to be relatively adjustable; of a clip rotatably attached to such adjustable member and having a lateral projection adapted in different positions of said clip to engage the part to be clamped and to leave such part free, respectively; means tending to hold said clip against rotation on said member, said means including a ring frictionally engaging one and non-rotatably secured to the other of the two parts in question; and other means limiting movement of said clip with said member to rotation from one such position to the other.

23. In a clamp device, the combination with a pair of members, one threaded on the other so as to be relatively adjustable; of a clip rotatably attached to such adjustable member; and means tending to hold said clip against rotation on said member, said means including a spring wire ring frictionally surrounding a portion of said member and having out-turned ends engaging said clip, so as non-rotatably to secure said ring thereto.

24. In a clamp device, the combination with a pair of members, one threaded in the other so as to be relatively adjustable; of a clip rotatably attached to such adjustable member and also capable of rocking movement with respect thereto, said clip having a lateral projection adapted in different positions of said clip to engage the part to be clamped and to leave such part free, respectively; means tending to hold said clip against rotation on said member, said means including a ring frictionally engaging the one and non-rotatably secured to the other of the two parts in question; and other means limiting movement of said clip with said member to rotation from one such position to the other.

25. In a clamp device, the combination with a pair of members, one threaded in the other so as to be relatively adjustable; of a clip rotatably attached to such adjustable member and also capable of rocking movement with respect thereto; and means tending to hold said clip against rotation on said member, said means including a spring wire ring frictionally surrounding a portion of said member and having out-turned ends engaging said clip, so as non-rotatably to secure said ring thereto.

26. The combination with a wheel and a demountable rim therefor; of means for securing said rim in place upon said wheel, said means including a bolt projecting laterally from said wheel, a nut threaded on said bolt and having an axial sleeve, a clip rotatably mounted on such sleeve and capable of rocking movement with respect to said nut, and a ring frictionally engaging such sleeve and non-rotatably secured to said clip.

27. The combination with a wheel and a demountable rim therefor; of means for securing said rim in place upon said wheel, said means including a bolt projecting laterally from said wheel, a nut threaded on said bolt and having an axial sleeve, a clip rotatably mounted on such sleeve and capable of rocking movement with respect to said nut, said clip also having a recess in its inner face, and a spring wire ring frictionally surrounding such sleeve and having out-turned ends engaging the recess in said clip, so as non-rotatably to secure said ring to the latter.

28. The combination with a wheel and a demountable rim therefor; of a wedge ring for holding said rim in place; and clamping means for said wedge ring, including a nut projecting laterally from said wheel, a nut threaded on said bolt, a clip mounted for rocking movement on and non-detachably carried by said nut, said clip being adapted in one position to bear at diametrically opposed points against said wedge ring and said wheel, respectively, and a spring wire ring frictionally surrounding a portion of said nut and having out-turned ends engaging said clip, so as non-rotatably to secure said ring thereto.

In testimony whereof, I hereunto affix my signature in the presence of two witnesses.

RICHARD S. BRYANT.

Witnesses:
BRENNAN B. WEST,
J. B. HULL.